US012634633B2

(12) United States Patent
Nguyen et al.

(10) Patent No.: US 12,634,633 B2
(45) Date of Patent: May 19, 2026

(54) VOICE COIL FOR AN ELECTRODYNAMIC ACTUATOR WITH STACKED CONDUCTIVE LAYERS

(71) Applicant: Sound Solutions International (Zhenjiang) Co., Ltd., Jiangsu Province (CN)

(72) Inventors: Hong-Bi Dong Nguyen, Vienna (AT); Gustav Otto, Vienna (AT)

(73) Assignee: Sound Solutions International (Zhenjiang) Co., Ltd., Zhenjiang City (CN)

( * ) Notice: Subject to any disclaimer, the term of this patent is extended or adjusted under 35 U.S.C. 154(b) by 374 days.

(21) Appl. No.: 18/233,706

(22) Filed: Aug. 14, 2023

(65) Prior Publication Data

US 2024/0064468 A1 Feb. 22, 2024

(30) Foreign Application Priority Data

Aug. 16, 2022 (AT) .............................. A 50628/2022

(51) Int. Cl.
*H04R 9/04* (2006.01)
*H04R 7/04* (2006.01)
(Continued)

(52) U.S. Cl.
CPC ............... *H04R 9/046* (2013.01); *H04R 7/04* (2013.01); *H04R 9/025* (2013.01); *H04R 9/06* (2013.01); *H04R 31/006* (2013.01)

(58) Field of Classification Search
CPC .......... H04R 9/046; H04R 9/02; H04R 31/00; H04R 2209/00; H04R 2499/11;
(Continued)

(56) References Cited

U.S. PATENT DOCUMENTS 11,716,572 B2 * 8/2023 Otto ......................... H04R 9/02 381/396
2002/0097118 A1 * 7/2002 Siekkinen ............ H01H 50/005 335/78
(Continued)

FOREIGN PATENT DOCUMENTS

JP 2009232049 A 10/2009
JP 2010268032 A 11/2010
(Continued)

OTHER PUBLICATIONS

Austrian Patent Office, Office Action issued in counterpart Austria patent application No. A50628/2022 on Aug. 16, 2022.

*Primary Examiner* — Carolyn R Edwards
*Assistant Examiner* — Julie X Dang
(74) *Attorney, Agent, or Firm* — Dykema Gossett PLLC

(57) ABSTRACT

A voice coil (4, 4*a* . . . 4*f*) for an electrodynamic actuator (6*a* . . . 6*c*) is disclosed, which comprises a plurality of conductive open annular strips (15, 15A . . . 15*n*, 15*a* . . . 15*h*) stacked over one another with insulation layers (18) in-between, wherein ends (Ea . . . Eh) of adjacent strips (15, 15A . . . 15*n*, 15*a* . . . 15*h*) overlap in an overlapping zone (ZO) when viewed in a direction parallel to a coil axis (CA) and wherein adjacent strips (15, 15A . . . 15*n*, 15*a* . . . 15*h*) are electrically connected to each other in a connection zone (ZC) within the overlapping zone (ZO). Ends (Ea . . . Eh) of the conductive strips (15, 15A . . . 15*n*, 15*a* . . . 15*h*) are embodied as non-straight ends, and positions (P) of connection zones (ZC), which connect different conductive strips (15, 15A . . . 15*n*, 15*a* . . . 15*h*), vary in a direction transversal to the circumferential direction (CD) in the overlapping zone (ZO). Moreover, a manufacturing meth-od for such a voice coil (4, 4*a* . . . 4*f*) and an electrodynamic actuator (6*a* . . . 6*c*), a speaker (1), an electrodynamic transducer (25*a*, 25*b*) and an output device with such a voice coil (4, 4*a* . . . 4*f*) are disclosed.

16 Claims, 8 Drawing Sheets

(51) Int. Cl.
*H04R 9/02* (2006.01)
*H04R 9/06* (2006.01)
*H04R 31/00* (2006.01)

(58) Field of Classification Search
CPC . H04R 9/025; H04R 9/06; H04R 1/06; H04R 9/063; H04R 9/045
See application file for complete search history.

(56) References Cited

U.S. PATENT DOCUMENTS

| | | | | |
|---|---|---|---|---|
| 2008/0252151 | A1* | 10/2008 | Binnard | H02K 41/03<br>310/12.22 |
| 2011/0109419 | A1* | 5/2011 | Cooper | H01F 5/06<br>336/206 |
| 2014/0105445 | A1* | 4/2014 | Kim | H04R 1/00<br>381/431 |
| 2016/0212546 | A1* | 7/2016 | Salvatti | H04R 9/06 |
| 2018/0332398 | A1* | 11/2018 | Reining | H04R 9/041 |
| 2020/0359135 | A1* | 11/2020 | Otto | H04R 9/046 |
| 2021/0337313 | A1 | 10/2021 | Leem | |
| 2022/0122758 | A1* | 4/2022 | Kim | H01F 41/041 |

FOREIGN PATENT DOCUMENTS

| | | | |
|---|---|---|---|
| JP | 2010268033 | A | 11/2010 |
| KR | 20040078627 | A | 9/2004 |
| KR | 102046430 | B1 | 11/2019 |
| KR | 20200030786 | A | 3/2020 |

* cited by examiner

VOICE COIL FOR AN ELECTRODYNAMIC ACTUATOR WITH STACKED CONDUCTIVE LAYERS

PRIORITY

This patent application claims priority from Austrian patent application No. A50628/2022, filed Aug. 16, 2022, entitled, "Improved Voice Coil for an Electrodynamic Actuator with Stacked Conductive Layers," the disclosure of which is incorporated herein, in its entirety, by reference.

BACKGROUND a. Technical Field

The invention relates to a voice coil for an electrodynamic actuator, which comprises an electrical conductor in the shape of loops running in a circumferential direction around a coil axis in a loop section, wherein the electrical conductor comprises a plurality of conductive open annular strips stacked over one another layer by layer in a direction parallel to the coil axis with insulation layers in-between. The ends of adjacent strips overlap in an overlapping zone when viewed in a direction parallel to the coil axis, and adjacent strips are electrically connected to each other in a connection zone within the overlapping zone. Moreover, the invention relates to a method of manufacturing such a voice coil. Finally, the invention relates to an electrodynamic actuator with at least one voice coil of the aforementioned kind as well as a speaker, an electrodynamic transducer and an output device with an electrodynamic actuator of said kind.

b. Background Art

A voice coil and its production method are generally known in prior art, for example from US 2020/0359135 A1. One disadvantage of the known solution is that the strips in the different layers are shaped differently and that welding joints, which connect adjacent strips, move along a circumferential direction there (refer to FIG. 2 in this context). Accordingly, manufacturing the prior art voice coil is laborious and the effective length of the electrical conductor in circumferential direction is shorter compared to wound voice coils. Thus, efficiency of an electrodynamic actuator with such a voice coil is poor. Moreover, a welding device has to move along the whole voice coil when high stacks are produced what requires comparably large movement ranges for the welding device.

BRIEF SUMMARY

Accordingly, it is an object of the invention to overcome the drawbacks of the prior art and to provide an improved voice coil, an improved manufacturing method for the same, an improved electrodynamic actuator, an improved speaker, an improved electrodynamic transducer and an improved output device. In particular, manufacturing of the voice coil shall be less laborious and the effective length of the electrical conductor in circumferential direction shall be increased. Moreover, efficiency of an electrodynamic actuator with such a voice coil shall be improved. Further on, production of voice coils shall be possible with welding devices with just a small movement range.

The problem of the invention is solved by a voice coil as defined in the opening paragraph, wherein the ends of the conductive open annular strips are embodied as non-straight ends, and wherein positions of connection zones, which connect different layers, vary in a direction transversal to the circumferential direction in the overlapping zone.

The problem of the invention is also solved by a method of manufacturing a voice coil for an electrodynamic actuator, which has an electrical conductor in the shape of loops running in a circumferential direction around a coil axis in a loop section, wherein the electrical conductor comprises a plurality of conductive open annular strips and wherein the method comprises the steps of:

a) cutting the conductive open annular strips out of a metallic foil, wherein the ends of the strips are embodied as non-straight ends;
b) forming insulation layers on the strips;
c) stacking the strips over one another layer by layer with the insulation layers in-between, wherein the ends of adjacent strips overlap in an overlapping zone,
d) electrically connecting adjacent strips to each other in a connection zone within the overlapping zone, wherein positions of connection zones, which connect different layers, vary in a direction transversal to the circumferential direction in the overlapping zone and
e) connecting the conductive open annular strips to each other by means of an adhesive.

Moreover, the problem of the invention is solved by an electrodynamic actuator, which is designed to be connected to a backside of a plate like structure or membrane opposite to a sound emanating surface of the plate like structure or the membrane and which comprises at least one voice coil of the aforementioned kind, and a magnet system being designed to generate a magnetic field transverse to the electrical conductor in the loop section, and wherein:

a) the at least one voice coil and the magnet system are movably coupled to each other allowing a relative movement between the voice coil and said magnet system in an excursion direction parallel to the coil axis; or
b) the at least one voice coil and a movable part of the magnet system are movably coupled to each other allowing a relative movement between the voice coil and said movable part of the magnet system in an excursion direction parallel to the coil axis.

In addition, the problem of the invention is solved by a speaker with an electrodynamic actuator of the above kind and a membrane, which is fixed to the at least one voice coil and to the magnet system (and which allows the aforementioned relative movement between the voice coil and the magnet system).

Further on, the problem of the invention is solved by an electrodynamic actuator of the above kind, wherein the at least one voice coil or the magnet system comprises a flat mounting surface, which is intended to be connected to the backside of the plate like structure opposite to a sound emanating surface of the plate like structure, wherein said backside is oriented perpendicularly to the coil axis.

Additionally, the problem of the invention is solved by an electrodynamic (acoustic) transducer, which comprises a plate like structure with a sound emanating surface and a backside opposite to the sound emanating surface and which comprises such an electrodynamic actuator connected to said backside.

Finally, the problem of the invention is solved by an output device, wherein the aforementioned plate like structure is embodied as a display and wherein the electrodynamic actuator is connected to the backside of the display.

By use of the proposed measures, manufacturing of the voice coil is less laborious, and the effective length of the electrical conductor in circumferential direction is increased compared to prior art stacked voice coils and equals wound voice coils. Thus, efficiency of an electrodynamic actuator with such a voice coil is improved compared to prior art electrodynamic actuators. Moreover, the production of voice coils is possible with welding devices with just a small movement range.

Generally, the ends of the conductive open annular strips can be asymmetrically shaped or can be symmetrically shaped. If they are asymmetrically, in particular there can be two possible positions for a connection zone, which alternatingly change in adjacent layers. If they are symmetrically, in particular there can be three two possible positions for a connection zone, wherein outer connection zones can be commonly used to connect adjacent strips, whereas the center connecting zone is used alone to connect adjacent strips. In this way, a cross section of the connection of two strips is basically the same for the outer connection zones and the center connecting zone.

Generally, if there are more than two possible positions for a connection zone, a deterministic scheme can be used how the positions change from layer to layer, but in principle the positions may change randomly as well.

One should note that the term "straight end" in the context of this disclosure strictly speaking means an end of a strip, which is formed by a single, straight line perpendicular to the circumferential direction of the strip. Accordingly, a "non-straight end" in the context of this disclosure strictly speaking means everything else or in other words, ends of strips, which are not formed by a single, straight line perpendicular to the circumferential direction of the strip. Hence, the definition or term "non-straight end" in the context of this disclosure inter alia includes:

- strip ends having one or more sections formed by a straight line perpendicular to said circumferential direction;
- strip ends formed by a single, straight line non-perpendicular to the circumferential direction of the strip; and
- strip ends having one or more sections formed by straight lines non-perpendicular to the circumferential direction of the strip.

In particular, "non-perpendicular" means angles ≤80° or ≥100° respectively.

In one embodiment, the ends of the conductive open annular strips are stepped. In this way, the area of the overlapping zone is comparably large compared to its circumferential extension. In an alternative embodiment, the ends of the conductive open annular strips are slanted (non-perpendicular). In this way, the ends are very easy to produce. In one further embodiment, the ends of the conductive open annular strips are curved. This shape is particularly advantageous, if the conductive strips are punched out of a metal foil.

The metal foil used for the conductive strips of the voice coil can be made up of copper, aluminum, and any copper alloy or aluminum alloy for example. Preferably, the thickness of a conductive strip is 10-50 μm. In this way, a desired number of turns can be provided within a desired height of the voice coil. The thickness of an insulation layer preferably is 0.5-5.0 μm. In this way, electric strength is high enough to withstand a voltage difference between the conductive strips, and the mechanical stability is high enough to withstand the forces applied to the voice coil during use, both without substantially decreasing the favorable power weight ratio of the voice coil. Generally, it is of advantage if the ratio between the longer side of a rectangular cross section of the voice coil and the smaller side of said rectangular cross section is >4. In this way, a preferred aspect ratio of the voice coil can be achieved along with a desired number of turns. It should be noted that the aforementioned ratio is not necessarily constant but may vary along the course of the electrical conductor if the width and/or the thickness of the electrical conductor is varied.

From the perspective of this point in time, a metal seems to be most useful for the production of voice coils. However, the proposed method applies to conductive foils in general. So, the term "metal foil" may mentally be replaced by the term "conductive foil" throughout this text, if a material different to a metal, but with comparable or better conductivity is provided.

It should be noted that steps a) to e) of the proposed production method do not necessarily imply a particular sequence of production steps. For example, step c) may implicitly take place when the conductive strips are connected to each other by means of an adhesive in step e) without the need of forming an insulation layer on the strips in a separate step. It should also be noted that mechanically connecting the conductive layers to each other by means of an adhesive in step e) does not necessarily follow the step of electrically connecting the stacked separate pieces in step d), but the electrical connection can follow the mechanical connection. In this context it should also be noted that a mechanical connection means a substantial connection of the conductive strips, in particular on an area of >50% of the area between two conductive strips. Strictly speaking, an electrical connection is also a mechanical connection, but it usually does not substantially enhance the stability of the layer construct. Further on, cutting the electrical conductor out of a metallic foil in step a) may also take place after the conductive layers have been connected to each other by means of an adhesive in step e).

It should also be noted that the proposed measures do not imply that a whole voice coil comprises the disclosed features or is exclusively manufactured by use of the proposed method steps. Instead, just a part of a voice coil can comprise the disclosed features or can be manufactured by use of the proposed method steps, whereas said features can be omitted in another part of the voice coil or whereas said another part of the voice coil can be manufactured by use of other method steps.

The proposed measures in particular apply to "micro" electrodynamic actuators. The proposed measures also apply to speakers in general and particularly to micro speakers, whose membrane area is smaller than 600 $mm^2$ and/or whose back volume is in a range from 200 $mm^3$ to 2 $cm^3$. Such micro speakers are used in all kinds of mobile devices such as mobile phones, mobile music devices, laptops and/or in headphones. It should be noted at this point, that a micro speaker does not necessarily comprise its own back volume but can use a space of a device, which the speaker is built into, as a back volume. That means, the speaker does not necessarily comprise its own (closed) housing but can comprise just an (open) frame. The back volume of the devices, which such speakers are built into, typically is smaller than 10 $cm^3$.

Generally an "electrodynamic actuator" transforms electrical power into movement and force. An electrodynamic actuator together with a membrane forms a "speaker". An electrodynamic actuator together with a plate forms an "electrodynamic (acoustic) transducer". A special embodiment of a plate is a display. In this case, an electrodynamic actuator together with a display forms an "output device"

(for both audio and video data). Generally, a speaker, an electrodynamic transducer and an output device transform electrical power into sound.

It should be noted that sound can also emanate from the backside of the plate like structure and the membrane. However, this backside usually faces an interior space of a device (e.g. a mobile phone), which the speaker or output device is built into. Hence, the plate like structure or membrane may be considered to have the main sound emanating surface and a secondary sound emanating surface (i.e. said backside). Sound waves emanated by the main sound emanating surface directly reach the user's ear, whereas sound waves emanated by the secondary sound emanating surface do not directly reach the user's ear, but only indirectly via reflection or excitation of other surfaces of a housing the device, which the speaker or output device is built into.

A "movable part of the magnet system" in the context of the disclosure means a part of the magnet system which can move relatively to the voice coil. Generally, a magnet system may have a fixed part, which is fixedly mounted to the voice coil or fixedly mounted in relation to the voice coil, and a movable part. It is also possible, that the whole magnet system is movable in relation to the at least one voice coil. In this case the movable part of the magnet system is the magnet system, and there is no fixed part. The movable part of the magnet system may be coupled to the voice coil by means of spring arms. The spring arms are not necessarily directly connected to the voice coil and the movable part of the magnet system but can be connected thereto indirectly as well, e.g. by use of a housing or frame.

The electrodynamic acoustic transducer may comprise a frame and/or a housing.

A "frame" commonly is a part, which holds together the membrane, the coil and the magnet system. Usually, the frame is directly connected to the membrane and the magnet system (e.g. by means of an adhesive), whereas the coil is connected to the membrane. Hence, the frame is fixedly arranged in relation to the magnet system. Normally, the frame together with the membrane, the voice coil and the magnet system form a sub system, which is the result of an intermediate step in a production process.

A "housing" normally is mounted to the frame and/or to the membrane and encompasses the back volume of a transducer, i.e. an air or gas compartment behind the membrane. Hence, the housing is fixedly arranged in relation to the magnet system. In common designs, the housing can be hermetically sealed respectively airtight. However, it may also comprise small openings or bass tubes as the case may be. Inter alia by variation of the back volume respectively by provision of openings in the housing, the acoustic performance of the transducer can be influenced.

A "conductive layer" is a layer of the voice coil which is able to conduct a substantial level of an electric current. In this invention, a conductive layer is formed by the conductive strips and is made from metal. It should be noted at this point that a "stack of conductive layers" or "stack of conductive strips" does not exclude the existence of other layers between conductive layers, what in particular refers to "insulation layers", "passivation layers" and/or "adhesive layers".

An "insulation layer" is a layer of the voice coil which withstands a substantial level of a voltage and is not able to conduct a substantial level of an electric current. Examples for materials, which can be used to build up an insulation layer, are plastic materials, ceramics and oxides. An insulation layer can comprise a layer of a single insulating material, layers of different insulating materials, like the materials mentioned before, or a layer or more layers comprising a mixture of materials.

A "passivation layer" is a protective layer on the conductive layer. It may be generated by oxidation of the metal of the conductive layer. Accordingly, a passivation layer can comprise metal oxides. Usually, passivation layers have insulating characteristics. In this case, a passivation layer is part of the insulation layer. The generation of a passivation layer is optional, and the insulation layer may also be built up without a passivation layer.

An "adhesive layer" is a layer, which mechanically connects two adjacent layers by adhesion. An adhesive layer usually has insulating characteristics, too. In this case, an adhesive layer is also part of the insulation layer. So, an insulation layer generally may comprise a passivation layer and/or an adhesive layer. An adhesive layer can be made of glue (in particular of a liquid glue), which is applied onto a conductive layer or onto a passivation layer on a conductive layer, for example by spraying, pad printing or rolling. Liquid glue may also be applied into a gap between two conductive layers or passivation layers. This glue is then sucked into the gap by means of capillary action. Liquid glue may comprise anaerobic or heat curing adhesives (e.g., epoxy, acrylic). The viscosity of the adhesive can be less than 1000 mPas. In some embodiments, the viscosity of the adhesive is less than 500 mPas or even less than 50 mPas. An adhesive layer may also be formed by a plastic foil, in particular by a single sided or double sided adhesive foil, which is applied onto a conductive layer or onto a passivation layer.

"Cutting" the electrical conductor out of a metallic foil in step a) may happen in a number of ways. For example, a laser, a water jet, plasma cutting, photo etching, a knife or punching may be used for performing the cutting step. Furthermore, the metallic foil can be cut piece by piece, or a number of layers can be cut in a single step. In the latter case, the layers may be interconnected (mechanically and/or electrically) or not. Accordingly, other layers than conductive layers, in particular insulation layers, passivation layers and/or adhesive layers may be cut at the same point in time.

It is noted that deviations from given numbers defined in the patent claims, which are unavoidable in reality due to technical tolerances, generally shall be covered by those patent claims anyway. In particular, this means that numbers defined in the patent claims are considered to include a range of +/−10% in view of the base value.

Further advantageous embodiments are disclosed in the claims and in the description as well as in the figures.

In a very advantageous embodiment, the (in particular all) open annular strips are identical but are alternatingly flipped by 180° along a flipping axis transversal to the circumferential direction at the overlapping zone. Flipping in particular can take place during step c). By these measures, manufacturing the voice coil can take place very efficiently because just one type of a strip is needed. In particular, the flipping axis coincides with a symmetry axis of the annular contour of the voice coil when viewed in a direction parallel to the coil axis and passes the overlapping zone, in particular the center of the overlapping zone.

In another advantageous embodiment, positions of connection zones, which connect different layers, in addition vary in the circumferential direction in the overlapping zone. In this way, a local thickening of the voice coil caused by the connection between different strips, i.e. caused by stacked welding joints, can substantially be reduced.

In yet another advantageous embodiment of the voice coil or the electrodynamic transducer, a conductive strip forms an electrical connection between the voice coil and a non-moving terminal of the voice coil or the electrodynamic transducer, i.e. a lead of the voice coil through which an electric signal is fed to the voice coil in operation of the electrodynamic transducer. Accordingly, the leads are integrally formed with the voice coil, and no further dedicated electrical connection between the voice coil and a non-moving terminal of the electrodynamic transducer like a wire is desired. Because the conductive strips are usually comparably thin on the grounds explained hereinbefore and because the longer side is transversely orientated to an excursion direction, an excellent compliance of the connecting conductor in the excursion direction of the membrane is provided. In other words, the leads are soft in the excursion direction of the membrane. That is why the electrical connection between the voice coil and a non-moving terminal of the voice coil or electrodynamic transducer of the proposed kind does not substantially influence the movement of the membrane. In particular, said connection neither substantially influences the damping of the acoustic system, nor its spring constant. The leads of the improved voice coil may also be cut from the foil sheet during the same process step of cutting the conductive strips for the loop section of the voice coil out of the foil blank. Additionally, the leads may be coated with a polyamide coating to improve fatigue and corrosion resistance of the leads. This coating process may take place before the cutting step or afterwards.

In one embodiment, the conductive open annular strip forming said electrical connection of the voice coil has only one adjacent of the conductive open annular strips. Accordingly, the electrical connection is located on the top and/or on the bottom of the voice coil. In another embodiment, the conductive open annular strip forming said electrical connection of the voice coil has two adjacent ones of the conductive open annular strips. Accordingly, the electrical connection is located in the middle of the voice coil. This is particularly useful in case of stacked voice coils.

Advantageously, a thickness of the conductive open annular strip forming said electrical connection of the voice coil is higher than the thickness of an adjacent one of the conductive open annular strips, which does not bend during movement of the voice coil. In this way, lifetime of the voice coil can be improved because the risk of breakage of the conductive strip forming said electrical connection is reduced.

In an advantageous embodiment of the proposed method, the conductive open annular strips are cut out of an aluminum foil in step a) and a passivation layer, which is part of the insulation layer, is formed on the conductive strips by exposing them to hot distilled or de-ionized water and/or to hot vapor of distilled or de-ionized water in step b). In addition to its superior weight to conductivity ratio in comparison to copper, aluminum allows to form a passivation layer when placed in contact with hot water or hot water vapor. The hot water vapor oxidizes the aluminum, creating a layer of aluminum oxide hydroxide, which electrically isolates the aluminum surface. The generated layers are also known as "Boehmite" layers. This process of creating the Boehmite layer is a particular embodiment of a passivation process. By the proposed measures, the conductive strips can be produced by use of simple and nonhazardous means.

Preferably, a conductive open annular strip is cut by means of a laser beam, a plasma beam or a water beam in step a). In this way, the conductive strip may comprise very fine structures. If a laser or plasma beam is used to cut the electrical strip out of a metallic foil in step a), no force is applied to the fragile piece of metal foil, and there is no risk of an unintended deformation of the conductive strip.

Beneficially, the conductive open annular strips are electrically connected by means of laser welding or ultrasonic welding in step d). In this way, a helical structure of the electrical conductor can be generated from the conductive strips. In particular, welding can take place after an insulation layer has been formed on the strips in step b). However, welding can also take place after two conductive strips have been connected to each other by means of an adhesive. Preferably, the coil is built up layer by layer then, meaning that a conductive strip is glued to another conductive strip and then the welding takes places. In a next cycle a further conductive strip is glued to the stack and another welding step takes place. This procedure is repeated until the stack has a desired height or number of conductive strip. Generally, the same laser can be used for welding, which is also used for cutting the electrical strips out of a metallic foil in step a).

In an advantageous embodiment of the proposed method, first the stack of conductive strips is made without an adhesive and then an adhesive is applied to the stacked conductive strips. According to this embodiment, "dry" pieces of the conductive strips are stacked forming small air gaps between the strips. In a next step the adhesive is applied and sucked into the gap between the strips by means of capillary action. In this way, the time for making the stack of conductive strips is not limited by the curing time of the single adhesive layers. Moreover, the stack of conductive strips may be made in a very clean way.

In the above context, it is of advantage if superfluous adhesive is removed by means of a laser or a water jet. When a laser is used, no force is applied to the stack of conductive strips so that there is no risk of an unintended deformation of the voice coil. In particular, a laser can be used, which is different to that used for cutting the conductive strips out of a metallic foil in step a). When a water jet is used, there is no risk of unintended welding together the circumferential edges of the conductive strips.

Advantageously, a supporting structure connected to a conductive strip by means of bars is cut out of the metallic foil in step a), and the supporting structure is removed from the conductive strip after step e). Because of the small cross section of the conductive strip, handling a single conductive strip may get tricky because of the flimsy structure. For this reason, a supporting structure connected to the conductive strip by means of bars may be cut out of a metallic foil in step a). This supporting structure reduces or eliminates twisting or deformation of the conductive strip when handling the same. For example, the supporting structure can comprise a frame, which is connected to the conductive strip by means of several bars. After step e), i.e. after the conductive strips have been interconnected mechanically by means of an adhesive thus stabilizing the layer structure and making the supporting structure superfluous, the supporting structure together with the bars is removed from the conductive strips. This may be again done by means of a laser, or the bars can simply be torn of from the conductive strips. Preferably, the same laser can be used, which is also used for cutting the conductive strips out of a metallic foil in step a).

In the above context, it is of advantage if the bars of adjacent conductive layers are located at different positions after step c) when viewed in a direction of the loop axis. In this way, the accessibility of the bars is improved so that removing them from the conductive strips is eased. In particular, the bars can be removed piece by piece. In particular, an indentation or groove can be formed along a tear off line of a bar connecting a conductive strip to a supporting structure. In this way tearing off the bar can be supported. For example, the indentation can be formed with a laser at low laser power, by etching or by embossing.

Beneficially, the coil can be coated with an insulating material after step c). In this way, the voice coil is protected against short circuits and environmental influences.

Beneficially, an average sound pressure level of the electrodynamic transducer or output device measured in an orthogonal distance of 10 cm from the sound emanating surface is at least 50 dB in a frequency range from 100 Hz to 15 kHz. "Average sound pressure level SPLAVG" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In a more mathematical language this means $$SPL_{AVG} = \frac{\int_{f=100}^{f=15000} SPL \cdot df}{15000 - 100}$$

It should be noted at this point that the embodiments proposed in view of the method of manufacturing a voice coil and the advantages obtained thereof equally apply to the voice coil as such and vice versa.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

Like reference numbers refer to like or equivalent parts in the several views.

DETAILED DESCRIPTION

Figure 1:
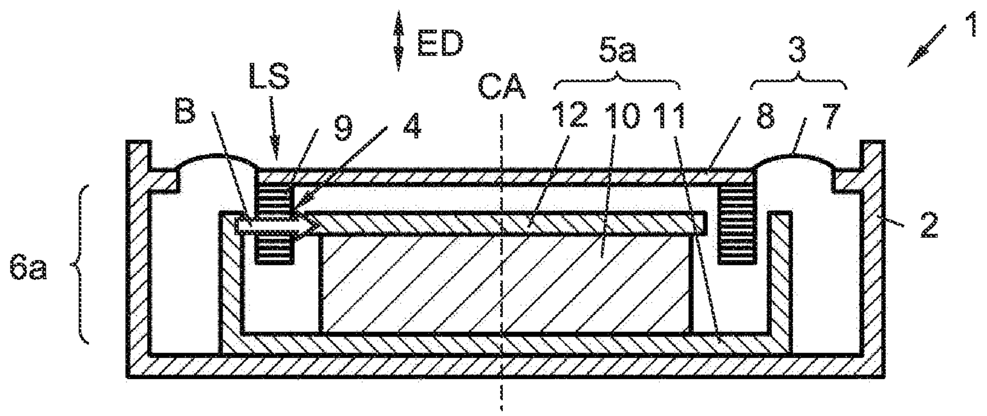
FIG. 1 shows a cross sectional side view of an exemplary speaker.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus", "minus", "upper", "lower", "upward", "downward", "left", "right", "leftward", "rightward", "front", "rear", "top", "bottom", "over", "under", "above", "below", "vertical", "horizontal", "clockwise", and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached", "coupled", "connected", and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially", which particularly means a deviation of ±10% from a reference value.

FIG. 1 shows an example of an electrodynamic acoustic transducer 1 in sectional view. The electrodynamic acoustic transducer 1 comprises a housing 2, a membrane 3 fixed to said housing 2, a voice coil 4 and a magnet system 5*a*. The voice coil 4 and the magnet system 5*a* together form a first example of an electrodynamic actuator 6*a*. The membrane 3 comprises a bending section 7 and an optional rigid center plate 8. The voice coil 4 is attached to the membrane 3 and has an electrical conductor 9 in the shape of loops running around a coil axis CA in a loop section LS. The magnet system 5*a* comprises a center magnet 10, a pot plate 11 and a top plate 12 and is designed to generate a magnetic field B transverse to the conductor 9 in the loop section LS. The pot plate 11 and the top plate 12 may be made from soft irone for example. A current through the conductor 9 of the voice coil 4 causes the membrane 3 to move in an excursion direction ED according to the electric signal applied to the voice coil 4.

Figure 2:
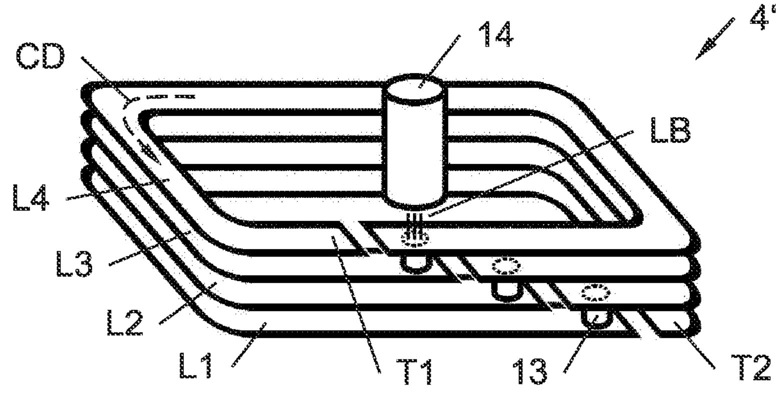
Fig. 2 (prior art)
FIG. 2 shows an oblique view of a prior art voice coil built up by separate conductive strips.

The electrical conductor 9 comprises a plurality of conductive open annular strips stacked over one another layer by layer in a direction parallel to the coil axis CA with insulation layers in-between. FIG. 2 shows a prior art voice coil 4' where the stacked strips in the layers L1 . . . L4 are pairwise welded together by means of welding joints 13, which are fabricated by means of a laser beam LB generated by a laser 14 so as to form a continuous electrical conductor 9. As it is visible in FIG. 2, the strips in the layers L1 . . . L4 are shaped differently and the welding joints 13 move along a circumferential direction CD from layer L1 . . . L4 to layer L1 . . . L4. Accordingly, manufacturing the voice coil 4' is laborious and the effective length of the electrical conductor 9 circumferential direction CD is shorter compared to wound voice coils. Thus, efficiency of such a voice coil 4' is poor. Moreover, the laser 14 has to move along the whole voice coil 4' when high stacks are produced what requires comparably large movement ranges for the laser 14.

Figure 3:
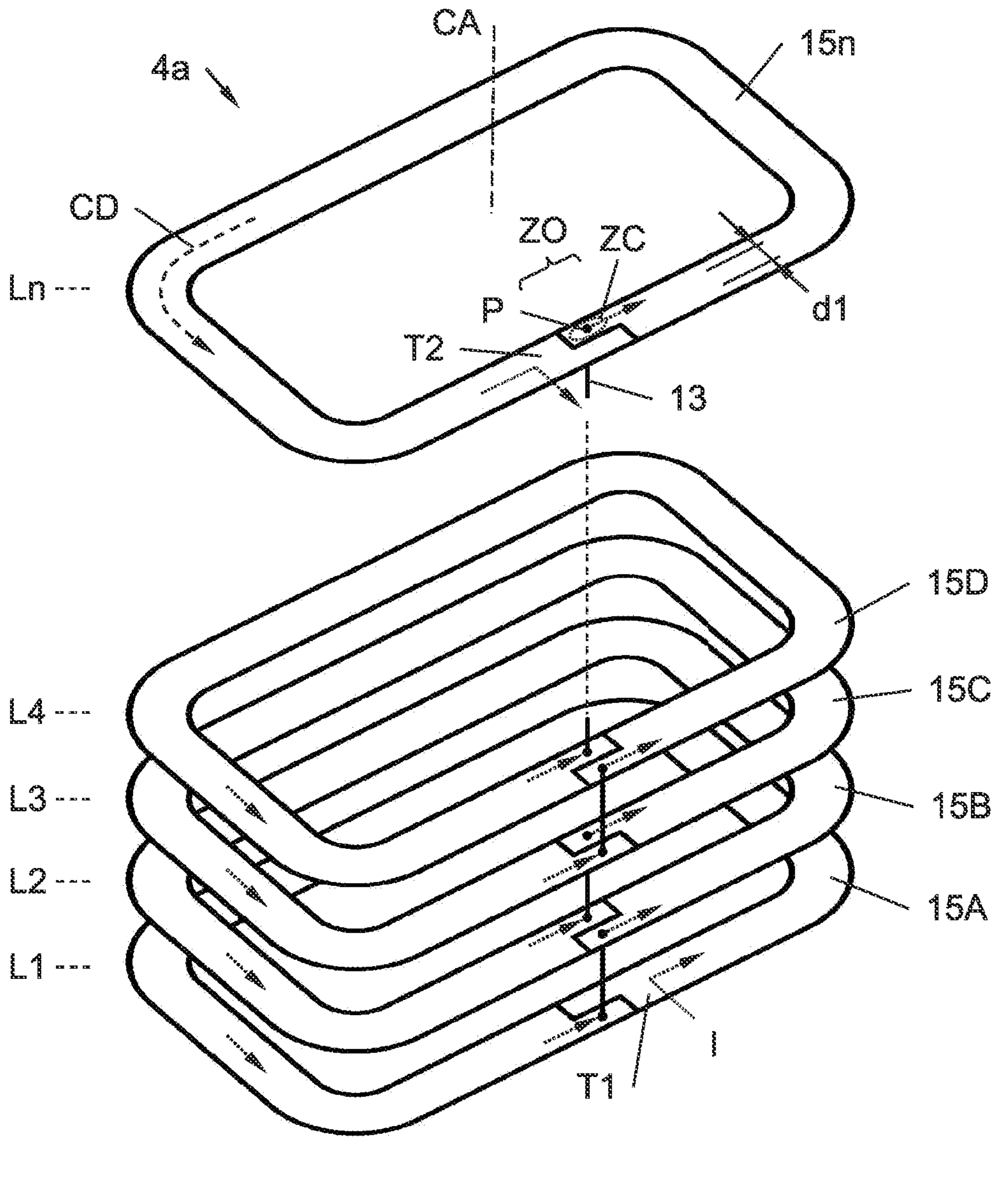
FIG. 3 shows a schematic view of a first example of a voice coil of the proposed kind.

FIG. 3 shows a first exemplary solution to address the above drawbacks. In detail, FIG. 3 shows a first example of a voice coil 4*a* in oblique schematic view, wherein the distance between the layers L1 . . . Ln is enlarged to better allow understanding of the proposed principle. Concretely, there is a number of conductive open annular strips 15A . . . 15*n*, wherein one of the strips 15A . . . 15*n* is arranged in each layer L1 . . . Ln. The strip 15A is arranged in the layer L1, the strip 15B is arranged in the layer L2 and so on. Ends of adjacent strips 15A . . . 15*n* overlap in an overlapping zone ZO when viewed in a direction parallel to the coil axis CA, and adjacent strips 15A . . . 15*n* are electrically connected to each other in a connection zone ZC within the overlapping zone ZO. The ends of the conductive open annular strips 15A . . . 15*n* are embodied as non-straight ends, in this example as asymmetric stepped ends (see FIGS. 7 to 14 for further examples). As is visible in FIG. 14, positions P of connection zones ZC, which connect different layers L1 . . . Ln, vary in a direction transversal to the circumferential direction CD in the overlapping zone ZO. In detail, a transversal distance d1 is between positions P in the different layers L1 . . . Ln. Additionally, a current I through the voice coil 4*a* flowing from a first terminal T1 of the voice coil 4*a* to a second terminal T2 of the voice coil 4*a* is shown in FIG. 3. FIG. 3 shows that the current I changes from an outer to an inner position P and vice versa from layer L1 . . . Ln to layer L1 . . . Ln. By use of the proposed measures, the effective length of the electrical conductor 9 along the circumferential direction CD is longer than for stacked prior art voice coils 4' (see FIG. 2) and equals wound voice coils. Thus, efficiency of such a voice coil 4*a* is improved. Moreover, the laser 14 just requires a small movement range (see also FIG. 5).

Figure 4:
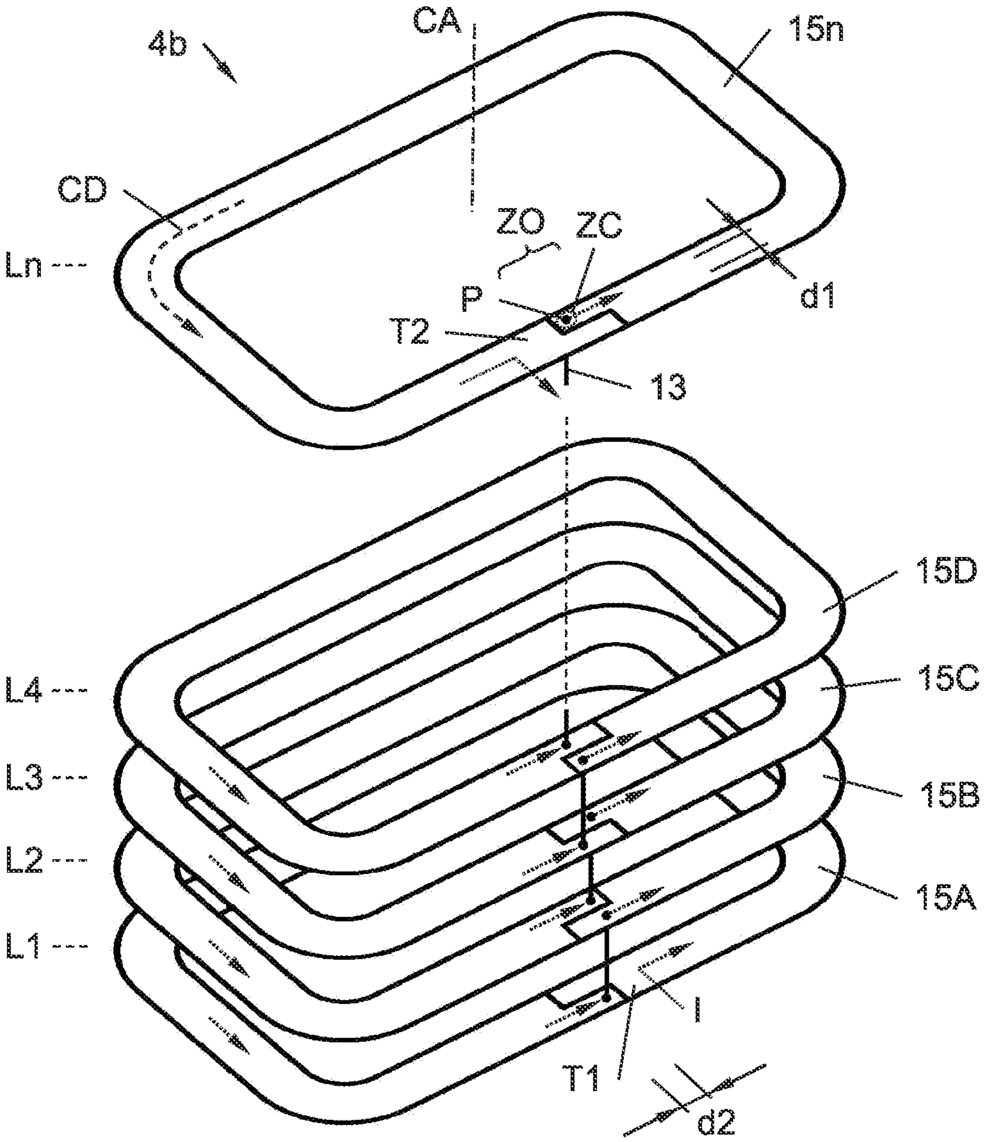
FIG. 4 shows a schematic view of a second example of a voice coil of the proposed kind, wherein the welding joints are additionally spaced in circumferential direction.

FIG. 4 shows a second embodiment of a voice coil 4*b*, which is very similar to the voice coil 4*a* of FIG. 3. In contrast, the positions P of the connection zones ZC in addition vary in the circumferential direction CD in the overlapping zone ZO. In detail, a circumferential distance d2 is between positions P in the different layers L1 . . . Ln, too. In this way, a local thickening of the voice coil 4*b* caused by the connection between different strips 15A . . . 15*n*, i.e. caused by stacked welding joints 13, can be further reduced.

Figure 5:
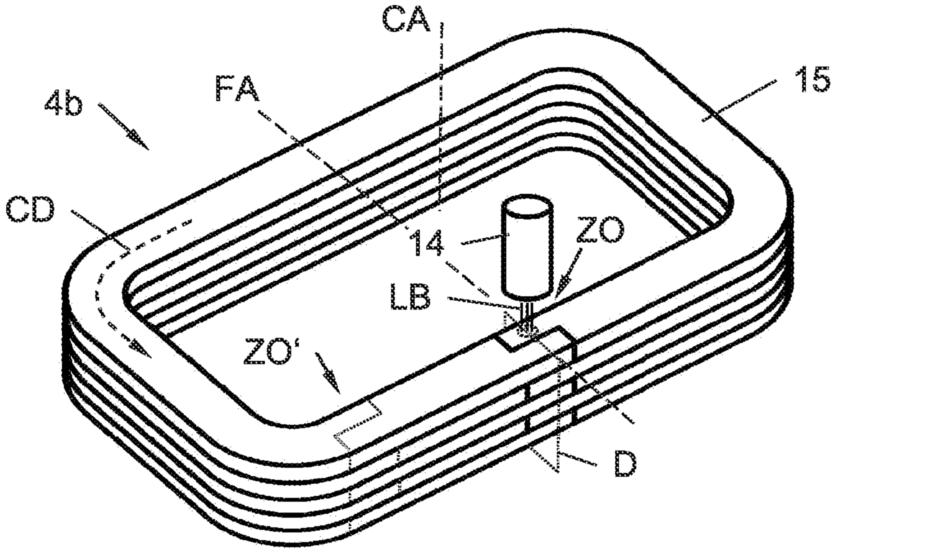
FIG. 5 shows an oblique view of an exemplary voice coil during production.

FIG. 5 shows an oblique view of the real voice coil 4*b* without enlarged distances between the strips 15A . . . 15*n* during manufacturing. Concretely, a laser 14, which outputs a laser beam LB produces the welding joints 13 between the strips 15A . . . 15*n*. FIG. 5 in addition shows that the (in particular all) open annular strips 15A . . . 15*n* may be identical and may be alternatingly flipped by 180° along a flipping axis FA transversal to the circumferential direction CD at the overlapping zone ZO. In this way, manufacturing the voice coil 4*b* can take place very efficiently because just one type of a strip 15A . . . 15*n* is needed. In particular, the flipping axis FA coincides with a symmetry axis of the annular contour of the voice coil 4*b* when viewed in a direction parallel to the coil axis CA and passes the overlapping zone ZO, in particular the center of the overlapping zone ZO, like this is the case in FIG. 5. However, this is not the only possibility, and FIG. 5 shows an alternative overlapping zone ZO' near a corner of the voice coil 4*b*.

Figure 6:
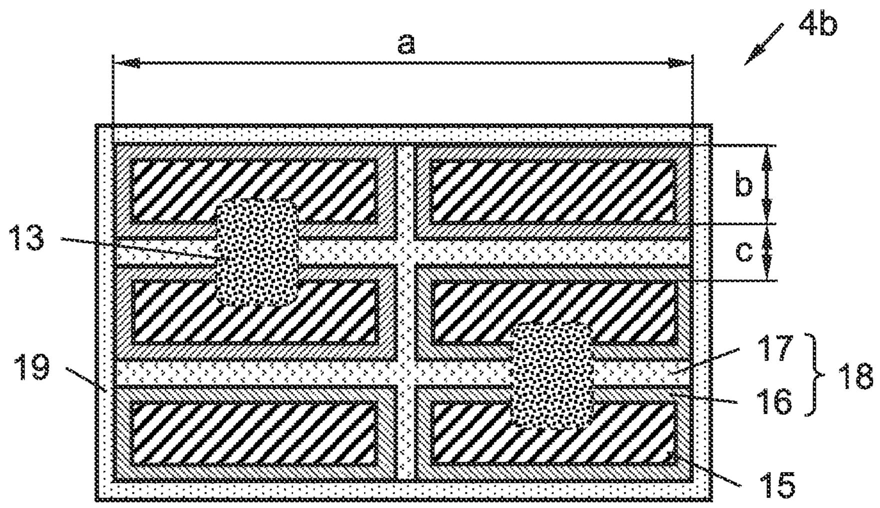
FIG. 6 shows detailed cross sectional view of an exemplary layer structure of a voice coil.

FIG. 6 shows a cross sectional view through the voice coil 4*b* in the cross sectional plane D, however, for the sake of simplicity just three layers L1 . . . L3 are depicted in FIG. 6. The sectional plane D is perpendicular to a circumferential direction CD of the electrical conductor 9 or perpendicular to a direction of a current I flowing through the electrical conductor 9. FIG. 6 particularly shows that the strip 15 has a rectangular cross section in this embodiment. Preferably, a ratio between a longer side a of the rectangular cross section and a shorter side b of the rectangular cross section is >4 as this is the case in FIG. 6. In this way, a preferred aspect ratio of the voice coil 4*b* can be achieved along with a desired number of turns.

Figure 16:
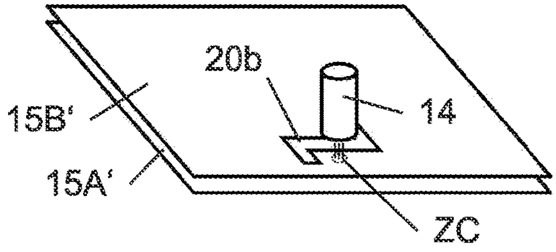
Figure 17:
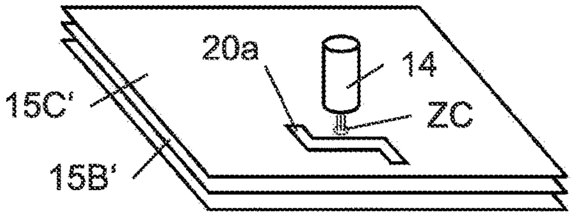
Figure 18:
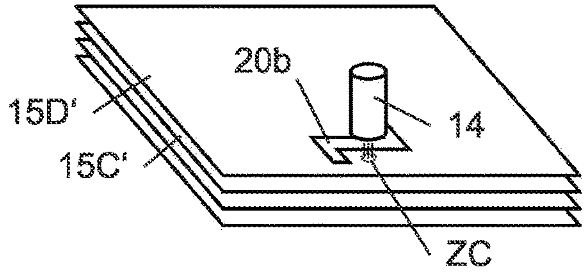

FIG. 6 moreover shows that optional passivation layers 16 are arranged on the conductive strips 15 which in this particular case even surround the conductive strips 15. The passivation layer 16, for example, can be formed on the strips 15 by exposing them to hot distilled or de-ionized water and/or to hot vapor of distilled or de-ionized water. FIG. 16 moreover shows an adhesive layer between the strip 15 by which the stack of strips 15 is hold together. The passivation layer 16 and the adhesive layer between the strip 15 together form the insulation layer 18. Preferably, a thickness b of the conductive strips 15 each can be 10-50 μm and/or a total thickness c of the insulation layers 18 preferably each can be 0.5-5.0 μm. An optional passivation layer 16 preferably can have a thickness of about 0.5-1.5 μm, and an adhesive layer 17 preferably can have a thickness of about 1-3 μm.

FIG. 6 additionally shows the welding joints 13 each between two adjacent strips 15. If the welding joint 13 is made by means of a laser 14, the laser power preferably is set to a level, at which it cracks a passivation layer 16 or even a complete insulation layer 18 if the same is already applied. By doing so, the laser 14 welds together only two conductive strips 15 without destroying the passivation layer 17 or insulation layer 18 offside the welding joint 13.

Finally, FIG. 6 shows a protective coating 19, which is made of an insulating material and which surrounds stack of strips 15. In this way, the coil 4*b* is protected against short circuits and environmental influences.

In the example of FIG. 6, the longer side a of the rectangular cross section of the electrical conductor 9 (that is the width extension of the electrical conductor 9) in said cross sectional view is arranged perpendicular to the coil axis CA. In other words, the longer side a is arranged in parallel with a field line of the magnetic field B through said conductor 9 or in parallel with the membrane 3 of the speaker 1. However, the angle between the longer side a of the rectangular cross section of the electrical conductor 9 and the coil axis CA may also be in a range of 80° to 100°.

In the example of FIG. 6, the thickness b of the electrical conductor 9 is constant along the coil axis CA. This however is no necessary condition, and the thickness b of the electrical conductor 9 may also vary along the coil axis CA.

Figure 7:
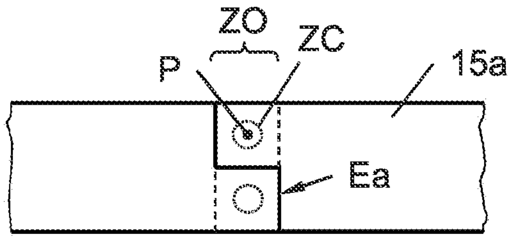
FIG. 7 shows a top view of a conductive strip with asymmetric stepped ends.
Figure 8:
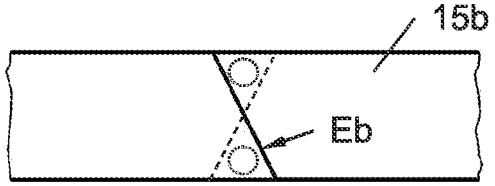
FIG. 8 shows a top view of a conductive strip with asymmetric slanted ends.
Figure 9:
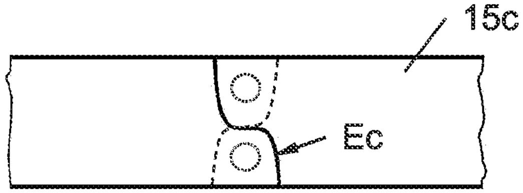
FIG. 9 shows a top view of a conductive strip with asymmetric curved ends.
Figure 10:
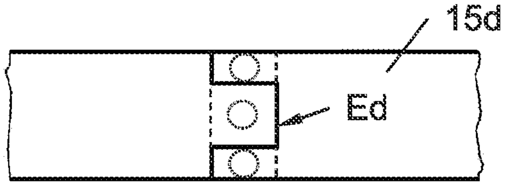
FIG. 10 shows a top view of a conductive strip with symmetric stepped ends.
Figure 11:
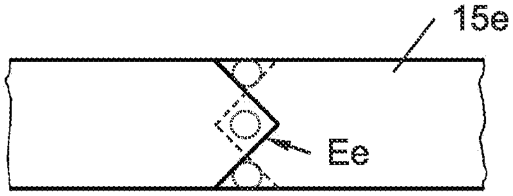
FIG. 11 shows a top view of a conductive strip with symmetric slanted ends.
Figure 12:
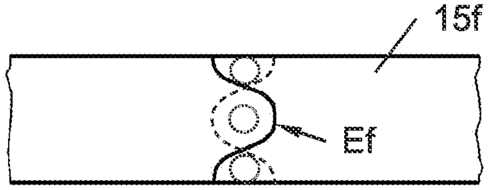
FIG. 12 shows a top view of a conductive strip with symmetric curved ends.
Figure 13:
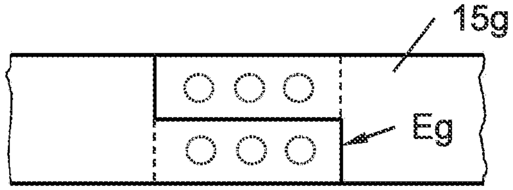
FIG. 13 shows a top view of a conductive strip with three possible positions for connection zones spaced in circumferential direction.
Figure 14:
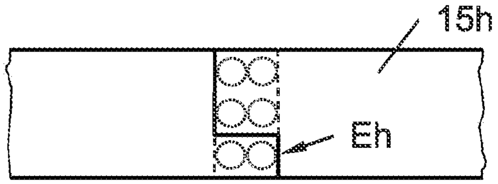
FIG. 14 shows a top view of a conductive strip with three possible positions for connection zones spaced in transversal direction.
Figure 15:
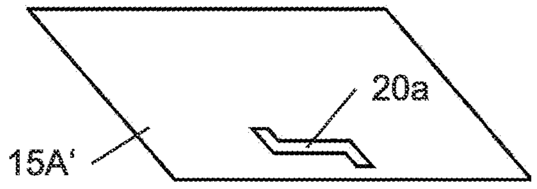
FIGS. 15 to 20 show process steps of a manufacturing method, in which the contour of the voice coil is cut out after a number of foil blanks have been stacked.

FIGS. 7 to 14 show a couple of possible embodiments of ends Ea . . . Eh of the conductive strips 15*a* . . . 15*h* in top view. Generally, the ends Ea . . . Eh can be asymmetrically shaped or symmetrically shaped. Moreover, preferably the ends Ea . . . Eh can be stepped, slanted or curved. In detail, FIG. 7 shows a strip 15*a* with an asymmetric stepped end Ea, FIG. 8 shows a strip 15*b* with an asymmetric slanted end Eb, FIG. 9 shows a strip 15*c* with an asymmetric curved end Ec, FIG. 10 shows a strip 15*d* with a symmetric stepped end Ed, FIG. 11 shows a strip 15*e* with a symmetric slanted end Ee, FIG. 12 shows a strip 15*f* with a symmetric curved end Ef, and FIGS. 13 and 14 show further examples of strips 15*g*, 15*h* with asymmetric stepped ends Eg, Eh. In the FIGS. 7 to 14 possible positions P for the connection zones ZC within the overlapping zones ZO are depicted. If there are two possible positions P, they alternatingly change between adjacent strips 15*a* . . . 15*h*. If there are more than two possible positions P, things are different. In a first embodiment, more than two connection zones ZC may be used to conductively connect adjacent strips 15*a* . . . 15*h*. This is particularly useful for the embodiments shown in FIGS. 10 to 12 where the outer connection zones ZC can be commonly used to connect adjacent strips 15*a* . . . 15*h*, whereas the center connecting zone ZC is used alone to connect adjacent strips 15*a* . . . 15*h*. In this way, a cross section of the connection of two strips 15*a* . . . 15*h* is basically the same for the outer connection zones ZC and the center connecting zone ZC. In another variant, a single connection zone ZC is used to connect adjacent strips 15*a* . . . 15*h*, even if there are more than two possible positions P. This is useful for the embodiments shown in FIGS. 10 to 12, too, but even more for the embodiments shown in FIGS. 13 and 14. For example, the strip 15*g* of FIG. 13 shows six possible positions P, of which one is chosen to connect adjacent strips 15*g*. In this way, a local thickening of the voice coil 4*b* caused by the connection between different strips 15*g*, 15*h*, i.e. caused by stacked welding joints 13, can substantially be reduced. In this context it should also be noted that the solution depicted in FIG. 13 corresponds to the solution shown in FIG. 4, however with six possible positions P instead of just four. FIG. 14 particularly illustrates that there can be more than two positions P spaced in transversal direction. Concretely, in FIG. 14, there are three positions P spaced in transversal direction instead of just two like this is the case for the embodiments depicted in FIGS. 3 to 13. However, there may be even more positions P spaced in transversal direction as well. It should also be noted that there is no deterministic scheme necessary how the positions P change from layer L1 . . . Ln to layer L1 . . . Ln. Instead, in principle the positions P may change randomly as well.

Generally, a method of manufacturing a voice coil 4*a* can comprise the steps of:

a) cutting the conductive open annular strips 15, 15A . . . 15*n*, 15*a* . . . 15*h* out of a metallic foil, wherein the ends Ea . . . Eh of the strips 15, 15A . . . 15*n*, 15*a* . . . 15*h* are embodied as non-straight ends;

b) forming insulation layers 18 on the strips 15, 15A . . . 15*n*, 15*a* . . . 15*h;* c) stacking the strips 15, 15A . . . 15*n*, 15*a* . . . 15*h* over one another layer L1 . . . Ln by layer L1 . . . Ln with the insulation layers 18 in-between, wherein the ends Ea . . . Eh of adjacent strips 15, 15A . . . 15*n*, 15*a* . . . 15*h* overlap in an overlapping zone ZO;

d) electrically connecting adjacent strips 15, 15A . . . 15*n*, 15*a* . . . 15*h* to each other in a connection zone ZC within the overlapping zone ZO, wherein positions P of connection zones ZC, which connect different layers L1 . . . Ln, vary in a direction transversal to the circumferential direction CD in the overlapping zone ZO; and e) connecting the conductive open annular strips 15, 15A . . . 15*n*, 15*a* . . . 15*h* to each other by means of an adhesive 17.

The metallic foil may be a copper foil or an aluminum foil or a foil made from an alloy based on copper or aluminum. Cutting in step a) may be done by means of a laser beam LB, a water jet, plasma cutting, photo etching, a knife or by punching for example. The passivation layer 17 preferably is a Boehmite layer, which is produced by exposing strips 15, 15A . . . 15*n*, 15*a* . . . 15*h* cut out of an aluminum (alloy) foil in step a) to hot distilled or de-ionized water and/or to hot vapor of distilled or de-ionized water.

Step c) can be done in different ways. For example, the strips 15, 15A . . . 15*n*, 15*a* . . . 15*h* can be glued to each other layer L1 . . . Ln by layer L1 . . . Ln. When doing so, glue is applied onto a first strip 15A, in particular onto its passivation layer 16, for example by spraying, pad printing or rolling, and by subsequently putting another strip 15B onto the adhesive layer 17. By repeating this sequence, a stack of any desired height can be produced. Alternatively, an insulating foil can be put onto the adhesive, which in turn is wetted with glue itself. Then a next conductive strip 15B is put onto the glue of the insulating foil. In a further alternative, a single sided or double sided adhesive plastic foil may be used to build up a stack. If a double sided adhesive plastic foil is used, no further glue is to be applied. If a single sided adhesive plastic foil is used, additional glue is used on the non-adhesive side of the foil.

In alternative embodiment, first the stack of conductive strips 15, 15A . . . 15*n*, 15*a* . . . 15*h* is made without an adhesive 17 and then an adhesive 17 is applied to the stacked conductive strips 15, 15A . . . 15*n*, 15*a* . . . 15*h*. That means, the adhesive 17 is sucked into the gap between the conductive strips 15, 15A . . . 15*n*, 15*a* . . . 15*h* by means of capillary action. In this way, the time for making the stack of conductive strips 15, 15A . . . 15*n*, 15*a* . . . 15*h* is not limited by the curing time of the single adhesive layers 17. Moreover, the stack of conductive strips 15, 15A . . . 15*n*, 15*a* . . . 15*h* may be made in a very clean way. Superfluous adhesive 17 may be removed by means of a laser 14 or a water jet.

Figure 19:
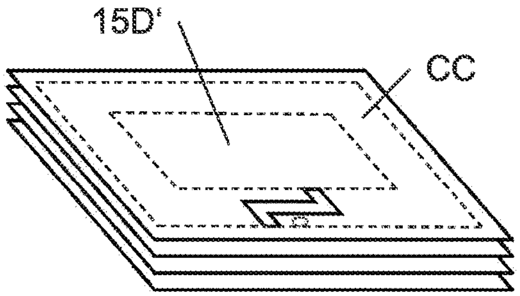
Figure 20:
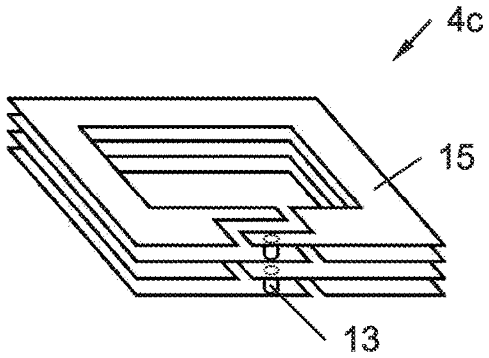

FIGS. 15 to 20 show an alternative method of manufacturing a coil 4*c* being depicted in FIG. 20. The method is similar to the one explained in the context with FIGS. 3 to 5, but the cutting step a) takes place after step e) here. In detail, a first piece of a metal foil 15A' is provided in a first step shown in FIG. 15. The metal foil 15A' comprises a cut out 20*a* at the later overlapping zone ZO. In FIG. 16 a further piece of a metal foil 15B' has been put onto the metal foil 15A'. The metal foil 15B' comprises a cut out 20*b* at the later overlapping zone ZO, too. The laser 14 makes a welding joint 13 to electrically connect the metal foil 15A' and the metal foil 15B' at the position indicated in FIG. 16. The same sequence is performed for a metal foil 15C' in FIG. 17 and a metal foil 15D' in FIG. 18. As can be seen, the cut outs 20*a* and 20*b* alternatingly change from layer L1 . . . Ln to layer L1 . . . Ln. As a result, a stack of metal foils 15A' . . . 15D', which are electrically connected by welding joints 13 at dedicated positions, is generated. This stack is shown in FIG. 19. In a further step, a coil contour CC is cut out of the stack of metal foils 15A' . . . 15D', e. g. by means of the laser 14, a water jet, plasma cutting, photo etching, a knife or by punching. Hence, a number of metal foils 15A' . . . 15D' are cut simultaneously in step a). Finally, the coil 4*c* is generated as depicted in FIG. 20.

In FIGS. 15 to 20 the cutting step a) takes place after step e), whereas in the embodiments of FIGS. 3 and 4 the cutting step a) takes place before step e). In yet another embodiment, the cutting step a) can take place after step d), but before step e). In another embodiment, not the whole coil 4*c* is produced by the method depicted in FIGS. 15 to 20. Instead, intermediate products or sub coils are produced by the method depicted in FIGS. 15 to 20 which are connected later on by a different connection method.

Generally, the metal foils 15A' . . . 15D' may have been passivated before they are used to build up a stack. Again, the stack can be built up of "dry" pieces of the metal foils 15A' . . . 15D', between which an adhesive 17 is applied and sucked into the gap between the metal foils 15A' . . . 15D' by means of capillary action. This can be done for each two pieces or once for the whole stack. But, making the stack of the metal foils 15A' . . . 15D' may also be done by application of glue onto a first metal foil 15A' or onto its passivation layer 16, for example by spraying, pad printing or rolling, and by subsequently putting another metal foil 15B' onto the adhesive layer 17. Alternatively, an insulating foil can be put onto the adhesive, which in turn is wetted with glue itself. Then the metal foil 15B' is put onto the glue on the insulating foil.

In a further alternative, a single sided or double sided adhesive plastic foil may be used to build up the stack. In this embodiment, the adhesive plastic foil is applied onto the first metal foil 15A', and the next metal foil 15B' is applied onto the adhesive plastic foil. If a double sided adhesive plastic foil is used, no further glue is to be applied. If a single sided adhesive plastic foil is used, additional glue is used on the non-adhesive side of the foil. By repeating the given sequences, a stack of any desired height can be produced.

Figure 21:
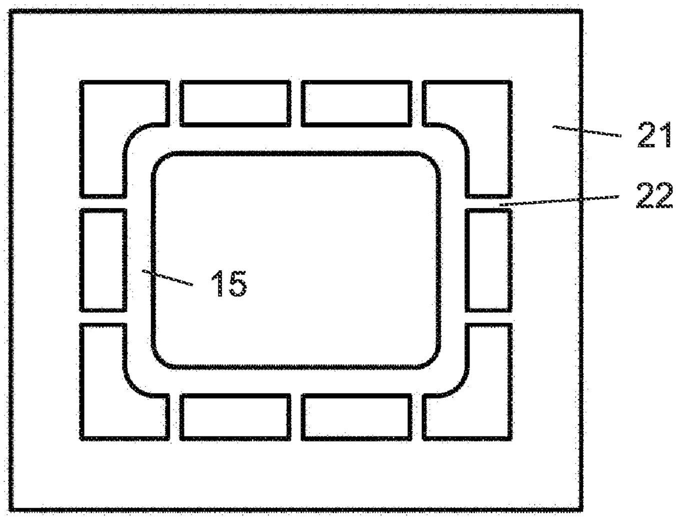
FIG. 21 shows a top view on a conductive strip with a supporting structure.

Because of the small cross section of the electrical conductor 9, handling a conductive strips 15 may get tricky because of its flimsy structure. For this reason, a supporting structure 21 connected to the strip 15 by means of bars 22 may be cut out of a metallic foil in step a) as this is shown in the example of FIG. 21. In detail, the supporting structure 21 consists of a comparably broad frame, which is connected to the conductive strip 15 by means of several bars 22. The supporting structure 22 reduces or eliminates twisting or deformation of the strip 15 when handling the same. The supporting structure 21 together with the bars 22 is removed from the strip 15 after step e), i.e. after the conductive strips 15 have been interconnected mechanically by means of an adhesive thus stabilizing the layer structure and making the supporting structure 21 superfluous.

It is of advantage in this context if the bars 22 of adjacent conductive strips 15 are located at different positions after step c) when viewed in a direction of the coil axis CA. In other words, the bars 22 are not stacked when the strips 15 are stacked, but the bars 22 of adjacent conductive strips 15 are displaced to each other. In this way, removing the bars 22 after step e) is eased. They may be cut away by means of the laser 14 or may simply be torn off. To ease tearing off the bars 22, a number of cut outs can be arranged along a tear off line, along which the bar 22 finally is torn off, thus forming a perforation. To ease tearing off the bars 22, alternatively or in addition, also an indentation or groove can be formed along a tear off line. A tear off line can be formed with a laser 14 at low laser power, by etching or by embossing.

Figure 22:
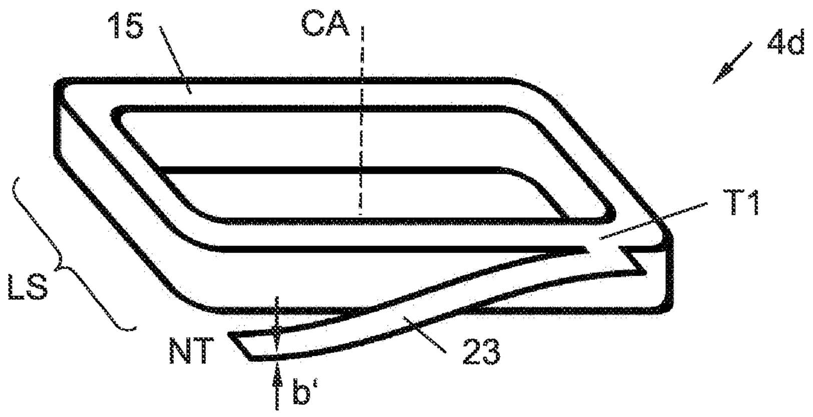
FIG. 22 shows an oblique view of an exemplary voice coil with a conductive strip forming a connection to a fixed terminal of the voice coil.

A conductive strip 15 may also (directly) form an electrical connection 23 between a coil 4*d* (in detail its loop section LS) and a non-moving terminal NT of the speaker 1 as this is illustrated in FIG. 22. The non-moving terminal NT may be fixed to the housing 2 or a frame of the speaker 1 and form an external terminal of the speaker 1 or electromagnetic actuator 6*a*. However, the non-moving terminal NT may also be connected to an external terminal by means of an additional conductor. Advantageously, no dedicated wires are needed to connect the loop section LS of the coil 4*d* to the non-moving terminal NT. Moreover, the conductive strip 15 has excellent bending characteristics in the direction of the coil axis CA and thus in the excursion direction ED of the membrane 3. In other words, the conductive strip 15 forming the electrical connection 23 between the coil 4*d* and a non-moving terminal NT is very soft against bending in the excursion direction ED of the membrane 3 and does not much hinder the membrane's movement.

In FIG. 22 just one strip 15 forming the electrical connection 23 is shown. However, of course it is possible that a second strip 15 at the bottom forms a second electrical connection 23 to a second non non-moving terminal NT or even that a further strip 15 in the middle of the stack forms a further electrical connection 23 to a further non non-moving terminal NT. Accordingly, the conductive strip 15 forming said electrical connection 23 can have only one adjacent of the conductive strips 15 or can have even two adjacent ones of the conductive strips 15.

To improve lifetime of the voice coil 4*d*, advantageously a thickness b' of the conductive strip(s) 15 forming the electrical connection(s) 23 can be thicker than the thickness b of an adjacent one of the conductive open annular strips 15, which does not bend during movement of the voice coil 4*d*.

Figure 23:
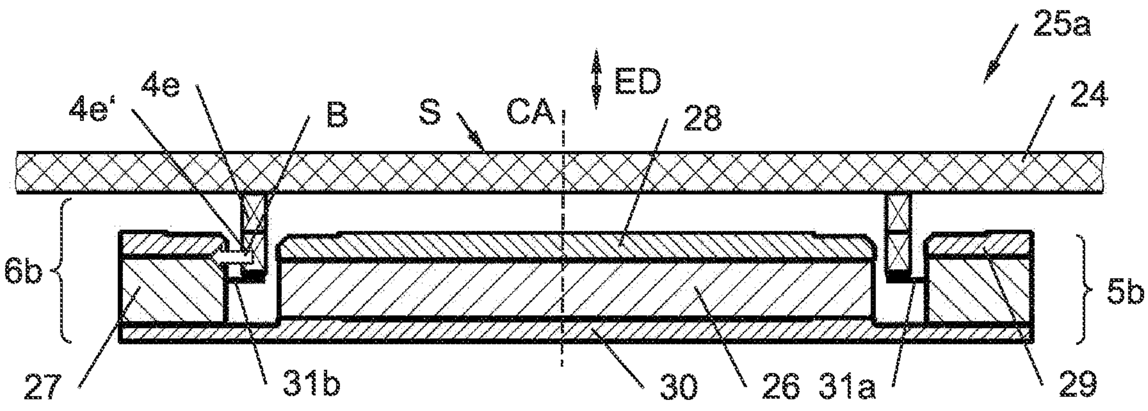
FIG. 23 shows cross section through a first example of an electrodynamic transducer formed by an electromagnetic actuator connected to plate and FIG. 24 shows an electrodynamic transducer like in FIG. 23 but with a two-part magnet system.
Figure 24:
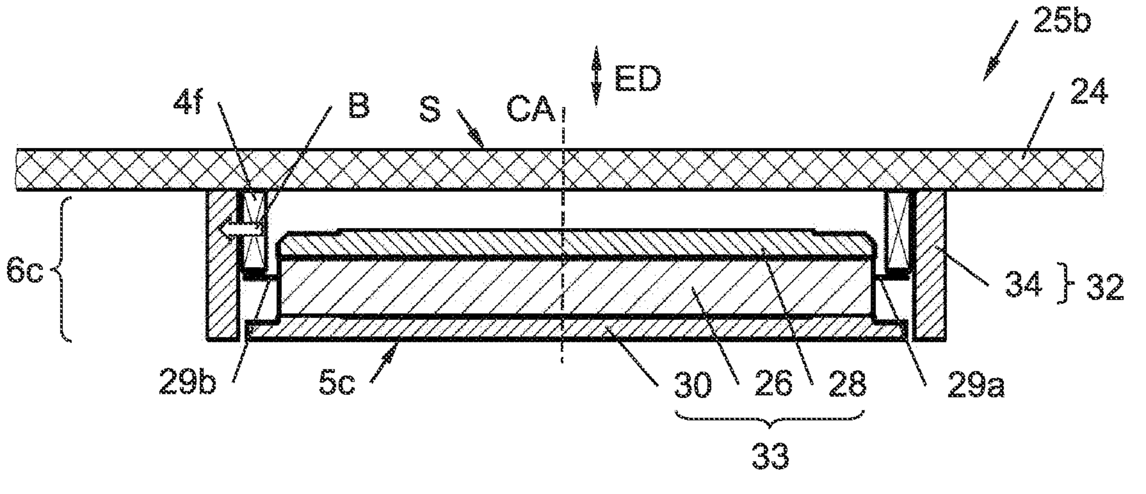

In the example shown in FIG. 1, the electromagnetic actuator 6*a* is connected to a membrane 3 thus forming a speaker 1. This however is no necessary condition, but an electromagnetic actuator 6*b*, 6*c* can also be connected to a plate like structure 24 like this is shown in FIGS. 23 and 24. In this way, electrodynamic transducers 25*a*, 25*b* are formed. In detail, the plate like structure 24 comprises a sound emanating surface S and a backside opposite to the sound emanating surface S. The electrodynamic actuator 6*b*, 6*c* is connected to its backside. For this reason, the voice coil 4*e*, 4*f* or the magnet system 5*b*, 5*c* can comprise a flat mounting surface, which is intended to be connected to the backside of the plate like structure 24, wherein said backside is oriented perpendicularly to the coil axis CA.

FIG. 23 shows a first example for such an electrodynamic transducer 25*a*. In contrast to the speaker 1 of FIG. 1, the electrodynamic transducer 25*a* comprises two voice coils 4*e*, 4*e*' stacked over another. In addition, the magnet system 5*b*, which comprises a center magnet 26, outer magnets 27, a center top plate 28, an outer top plate 29 and a bottom plate 30 here, is not connected to the plate like structure 24, but it may freely move in relation to the voice coils 4*e*, 4*e*'. In detail, spring arms 31*a*, 31*b*, which connect the voice coil 4*e*' to the outer magnets 27, allow said relative movement. In the example of FIG. 22 a dedicated frame is omitted. Nonetheless, the electrodynamic transducer 25*a* can also comprise a frame as the case may be. The center top plate 28, the outer top plate 29 and the bottom plate 30 can be made from soft iron, for example.

FIG. 24 shows an example of an electrodynamic transducer 25*b*, which is similar to the electrodynamic transducer 25*a* of FIG. 23. The main difference is that the magnet system 5*c* comprises a fixed part 32 and a movable part 33. The fixed part 32 in this example is formed by an outer ring 34 from soft iron, and the movable part 33 is formed by the center magnet 26, the center top plate 28 and the bottom plate 30, wherein the center top plate 28 and the bottom plate 30 can be made from soft iron as well. Another difference is that the spring arms 31*a*, 31*b* are arranged on the inner side of the voice coil 4*f* and connect the same to the movable part 33 of the magnet system 5*c* Thus the movable part 33 may freely move relative to the voice coil 4*f*.

In general, as said, an electromagnetic actuator 6*b*, 6*c* together with the plate like structure 24 forms an electrodynamic transducer 25*a*, 25*b*. For example, the plate like structure can be a passive structure, for example a part of a housing of a device, which the electromagnetic actuator 6*b*, 6*c* is built into. However, the plate like structure can also have a special function itself. For example, if the plate like structure 24 can be embodied as a display, wherein the electrodynamic actuator 6*b*, 6*c* together with the display forms an output device (for both audio and video data).

In contrast to a membrane 3, a plate like structure 24 in the sense of this disclosure has no dedicated flexible part 7 like the membrane 3 has. Accordingly, there is no extreme separation of deflection and piston movement like it is the case for the flexible membrane part 7 (deflection) and a rigid membrane part 8 (piston movement). Instead, sound generation is done via deflection of the whole plate like structure 24. When a plate like structure 24 is used, moreover either the voice coil 4*e*, 4*d* or the magnet system 5*b*, 5*c* (or at least a part thereof) is connected to the plate like structure 24 or fixedly arranged in relation to the plate like structure 24. A force applied to the plate like structure 24 may be generated by the inertia of the part of the electrodynamic actuator 6*b*, 6*c* which is moved in relation to the plate like structure 24 (which is the magnet system 5*b* in case of FIG. 23 and the movable part 33 of the magnet system 5*c* in case of FIG. 24) or because the part of the electrodynamic actuator 6*b*, 6*c* which is moved in relation to the plate like structure 24 is fixed to another part (e.g. to a housing of a device, which the electrodynamic actuator 6*b*, 6*c* is built into).

In general, a speaker 1 or an electrodynamic transducer 25*a*, 25*b* (or output device) of the kind disclosed hereinbefore preferably produces an average sound pressure level of at least 50 dB_SPL in a frequency range from 100 Hz to 15 kHz measured in an orthogonal distance of 10 cm from the sound emanating surface S. In particular, the above average sound pressure level is measured at 1 W electrical power more particularly at the nominal impedance.

It should be noted that the invention is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention.

In particular it should be noted that although the use of a laser 14 for producing the welding joints 13 is depicted in the Figs., other connection methods are applicable as well, for example ultrasonic welding. Moreover, other connection methods than welding can be used to produce the electrical connections between conductive strips 15. For example, soldering or using a conductive glue can be used for that reason.

The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1 speaker
2 housing
3 membrane
4, 4', 4*a* . . . 4*f* voice coil
5*a* . . . 5*c* magnet system
6*a* . . . 6*c* electrodynamic actuator
7 bending section
8 rigid center plate
9 electrical conductor
10 center magnet
11 pot plate
12 top plate
13 welding joint
14 laser
15, 15A . . . 15*n*, 15*a* . . . 15*h* conductive open annular strip
15A' . . . 15D' metal foil forming the conductive open annular strip
16 passivation layer
17 adhesive
18 insulation layer
19 coating
20*a*, 20*b* cut out
21 supporting structure
22 bar
23 electrical connection to non-moving terminal
24 plate like structure
25*a*, 25*b* electrodynamic transducer
26 center magnet
27 outer magnet
28 center top plate
29 outer top plate
30 bottom plate
31*a*, 31*b* spring arm
32 fixed part of magnet system
33 movable part of magnet system
34 outer ring
a width of the conductive strip (longer side)
b, b' thickness of the conductive strip (shorter side)
c (total) thickness of insulation layer
d1 transversal distance
d2 circumferential distance
B magnetic field
CA coil axis
CC coil contour
CD circumferential direction
D cross sectional plane
Ea . . . Eh end of strip
ED excursion direction
FA flipping axis
I current
L1 . . . Ln (conductive) layer
LB laser beam
LS loop section
NT non-moving terminal
P position of connection zone
S sound emanating surface
T1, T2 terminal
ZC connection zone
ZO, ZO' overlapping zone

What is claimed is:

1. A voice coil for an electrodynamic actuator, comprising an electrical conductor in the shape of loops running in a circumferential direction around a coil axis in a loop section, wherein the electrical conductor comprises a plurality of conductive open annular strips stacked over one another layer by layer in a direction parallel to the coil axis with insulation layers in-between, wherein ends of adjacent strips overlap in an overlapping zone when viewed in a direction parallel to the coil axis, wherein adjacent strips are electrically connected to each other in a connection zone within the overlapping zone, wherein the ends of the conductive open annular strips are embodied as non-straight ends, and wherein positions of connection zones, which connect different layers, vary in a direction transversal to the circumferential direction in the overlapping zone.

2. The voice coil as claimed in claim 1, wherein the open annular strips are identical but are alternatingly flipped by 180° along a flipping axis transversal to the circumferential direction in the overlapping zone.

3. The voice coil as claimed in claim 1, wherein the ends of the conductive open annular strips are either:

asymmetrically shaped; or symmetrically shaped.

4. The voice coil as claimed in claim 1, wherein the ends of the conductive open annular strips are stepped, slanted or curved.

5. The voice coil as claimed in claim 1, wherein positions of connection zones, which connect different layers, in addition vary in the circumferential direction in the overlapping zone.

6. The voice coil as claimed in claim 1, wherein the conductive open annular strips have a rectangular cross section and wherein a ratio between a longer side (a) of the rectangular cross section and a shorter side (b) of the rectangular cross section is >4.

7. The voice coil as claimed in claim 1, wherein a thickness of the conductive open annular strips each is 10-50 um and/or a total thickness of the insulation layers each is 0.5-5.0 um.

8. The voice coil as claimed in claim 1, wherein a conductive open annular strip of the conductive open annular strips forms an electrical connection between the voice coil and a non-moving terminal of the voice coil.

9. The voice coil as claimed in claim 8, wherein the conductive open annular strip forming said electrical connection of the voice coil has only one adjacent of the conductive open annular strips or has two adjacent ones of the conductive open annular strips.

10. The voice coil as claimed in claim 8, wherein a thickness of the conductive open annular strip forming said electrical connection of the voice coil is thicker than the thickness of an adjacent one of the conductive open annular strips.

11. An electrodynamic actuator, which is designed to be connected to a backside of a plate like structure or membrane-opposite to a sound emanating surface of the plate like structure or the membrane and which comprises:

at least one voice coil as claimed in claim 1; and a magnet system being designed to generate a magnetic field transverse to the electrical conductor in the loop section, wherein either:

a) the at least one voice coil and the magnet system are movably coupled to each other allowing a relative movement between the voice coil and said magnet system in an excursion direction parallel to the coil axis; or b) the at least one voice coil and a movable part of the magnet system are movably coupled to each other allowing a relative movement between the voice coil and said movable part of the magnet system in an excursion direction parallel to the coil axis.

12. A speaker, characterized by an electrodynamic actuator as claimed in claim 11 and a membrane, which is fixed to the at least one voice coil and to the magnet system.

13. The electrodynamic actuator as claimed in to claim 11, wherein the at least one voice coil or the magnet system comprises a flat mounting surface, which is intended to be connected to the backside of the plate like structure opposite to a sound emanating surface of the plate like structure, wherein said backside is oriented perpendicularly to the coil axis.

14. An electrodynamic transducer, comprising a plate like structure with a sound emanating surface and a backside opposite to the sound emanating surface and comprising an electrodynamic actuator connected to said backside, characterized in that the electrodynamic actuator is designed according to claim 13.

15. The electrodynamic transducer as claimed in claim 14 characterized in that an average sound pressure level of the electrodynamic transducer measured in an orthogonal distance of 10 cm from the sound emanating surface is at least 50 dB_SPL in a frequency range from 100 Hz to 15 KHz.

16. An output device characterized in that the plate like structure as claimed in claim 15 is embodied as a display and that the electrodynamic actuator is connected to the backside of the display.

* * * * *